United States Patent
Tozaki et al.

(10) Patent No.: US 7,225,192 B2
(45) Date of Patent: May 29, 2007

(54) HYBRID RECORDING MEDIUM AND INFORMATION RECORDING APPARATUS

(75) Inventors: Akihiro Tozaki, Saitama (JP); Masahiro Katsumura, Saitama (JP); Kiyoshi Takei, Saitama (JP); Teruo Baba, Saitama (JP); Manahiko Hashiotani, Saitama (JP); Masami Suzuki, Saitama (JP); Tohru Kanegae, Saitama (JP)

(73) Assignee: Pioneer Corporation, Tokyo (JP)

( * ) Notice: Subject to any disclaimer, the term of this patent is extended or adjusted under 35 U.S.C. 154(b) by 318 days.

(21) Appl. No.: 09/816,352

(22) Filed: Mar. 26, 2001

(65) Prior Publication Data

US 2001/0048640 A1    Dec. 6, 2001

(51) Int. Cl.
*G06F 17/00* (2006.01)
*G06F 7/00* (2006.01)

(52) U.S. Cl. .................................. 707/100; 369/275.3

(58) Field of Classification Search ............. 369/275.1, 369/275.3, 14, 32; 707/100, 104.1
See application file for complete search history.

(56) References Cited

FOREIGN PATENT DOCUMENTS

| EP | 0 604 946 A1 | 7/1994 |
|---|---|---|
| EP | 0 653 758 A2 | 5/1995 |

OTHER PUBLICATIONS

Japanese Abstract No. 08305282, dated Nov. 22, 1996.
"Optical/Magnetic Disk", Research Disclosure, Kenneth Mason Publications, Hampshire, GB, No. 303, Jul. 1, 1989, p. 482.

*Primary Examiner*—Sam Rimell
(74) *Attorney, Agent, or Firm*—Sughrue Mion, PLLC (57) ABSTRACT

A hybrid recording medium includes a read-only area in which a file is previously recorded, and a write area capable of updating and recording the file, characterized in that volume configuration information 21 and VTOC 22 about a file system are recorded in the write area is used in an information record apparatus.

2 Claims, 6 Drawing Sheets

*FIG. 10*   PRIOR ART

HYBRID RECORDING MEDIUM AND INFORMATION RECORDING APPARATUS

BACKGROUND OF THE INVENTION

1. Field of the Invention

The present invention relates to a hybrid recording medium having a read-only area in which a file is previously recorded and a write area capable of updating and recording the file on a portable recording medium typified by an optical disk, and an information record apparatus for recording information to this hybrid recording medium.

2. Description of the Related Art

Figure 9:
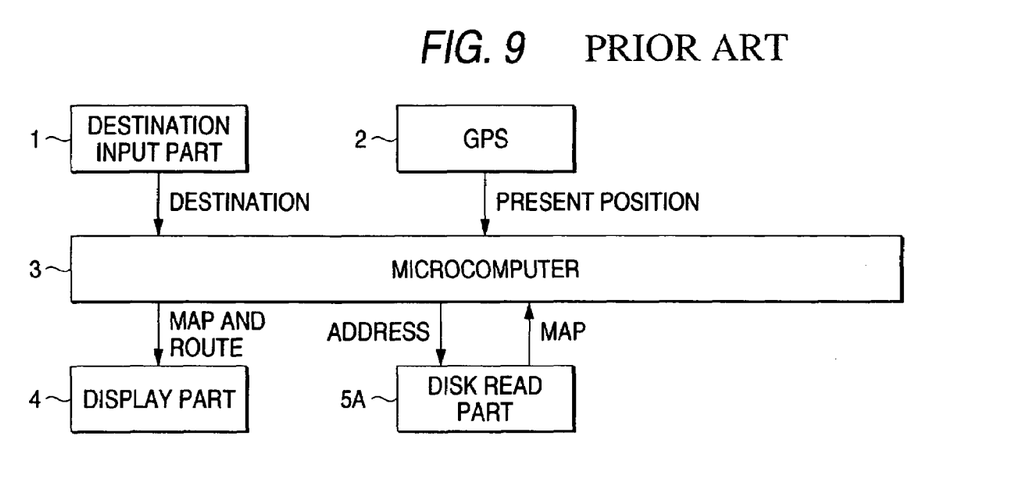
FIG. 9 is a conceptual diagram illustrating the whole configuration of a conventional car navigation system.

As an example of a file system, a car navigation system commercialized presently can be given. One example of this car navigation system is shown in FIG. 9. This system is provided to a user by reading out a corresponding map or route information to a destination as necessary from disk media such as CD-ROM or DVD-ROM in which map information is previously recorded on the basis of the present position information of my car obtained by a GPS (Global Positioning System) 2 and outputting them to a display part 4.

Figure 10:
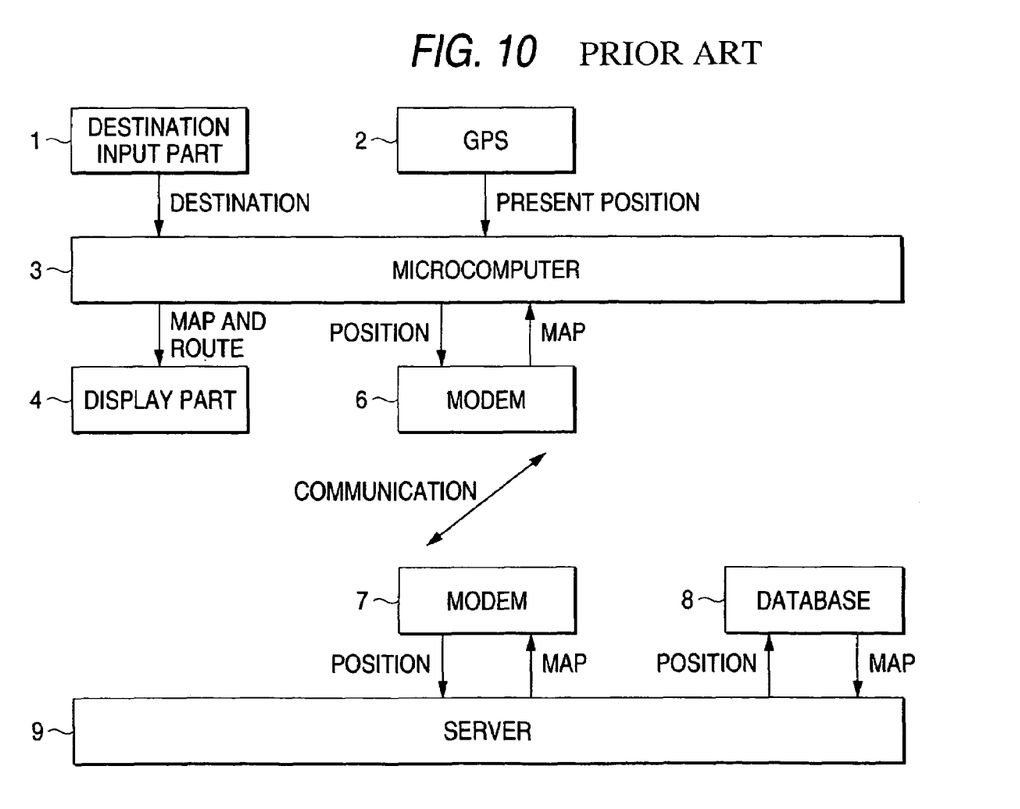
FIG. 10 is a conceptual diagram illustrating the whole configuration of a car navigation system of communication type.

Also, as shown in FIG. 10, a system for performing navigation by acquiring the newest map information by communication means from a database 8 of a server 9 present on a network such as the Internet rather than by acquiring map information from the disk media such as DVD-ROM has been proposed.

By the way, changed information cannot be recorded in the disk media such as DVD-ROM, so that the newest map information after the change cannot be acquired from the disk media when the map information is changed. Also, when the newest map information is acquired using the network, there is a problem that a communication cost becomes enormous due to frequent connections of a line to the network. In addition, when the network is utilized, there is a problem that the information cannot be obtained in case that communication becomes impossible due to radio wave disturbance in the mountains.

SUMMARY OF THE INVENTION

The invention is implemented to solve the problems, and an object of the invention is to propose a hybrid recording medium capable of recording and reading out changed information and an information record apparatus for recording information to the hybrid recording medium.

In order to solve the problems, according to a first aspect of the invention, there is provided a hybrid recording medium comprising a read-only area in which a file is previously recorded, and a write area capable of updating and recording the file, file management information about the file is recorded in the write area.

According to the first aspect of the invention, the read-only area and the write area of the hybrid recording medium are handled as one volume, so that this hybrid recording medium can be applied in a system of handling ROM media of one volume like a conventional type car navigation system.

Also, according to a second aspect of the invention, in a hybrid recording medium as defined in the first aspect, the file management information is volume configuration information in a volume of a file system including the file and file configuration information included in said volume.

According to the second aspect of the invention, the file management information of a hybrid recording medium as defined in the first aspect is volume configuration information in a volume of a file system and file configuration information included in said volume, so that this hybrid recording medium can be applied in a general file system.

Also, according to a third aspect of the invention, in a hybrid recording medium as defined in the first or second aspect, only a file is recorded in the read-only area.

According to the third aspect of the invention, only a file is recorded in the read-only area of a hybrid recording medium as defined in the first or second aspect, so that the file previously recorded in the read-only area of said hybrid recording medium is not lost even if information about the write area of said hybrid recording medium is rewritten.

Also, according to a fourth aspect of the invention, in a hybrid recording medium as defined in any one of the first to third aspects, the hybrid recording medium is an optical disk having at least two record surfaces of a read-only surface which is the read-only area and a write surface which is the write area.

According to the fourth aspect of the invention, the hybrid recording medium as in defined in any one of the first to third aspects is an optical disk having at least two record surfaces of a read-only surface which is the read-only area and a write surface which is the write area, so that this optical disk can be applied in a system of handling a ROM disk of one volume like a conventional type car navigation system.

Also, according to a fifth aspect of the invention, in a hybrid recording medium as defined in the fourth aspect, the optical disk is formed in order of the read-only surface and the write surface from the irradiation side of a read beam of an optical pickup.

According to the fifth aspect of the invention, the optical disk is formed in order of the read-only surface and the write surface from the irradiation side of a read beam of an optical pickup, so that in the optical disk, optical transmittance of the read-only surface can be made higher than that of the write surface, with the result that the optical disk with good optical transmittance can be formed.

Also, according to a sixth aspect of the invention, there is provided an information record apparatus capable of having access to a hybrid recording medium as in any one of the first to fifth aspects and conducting information communications with an information server, the information record apparatus comprising server information acquisition means for acquiring file management information recorded in the information server, hybrid record information acquisition means for acquiring file management information recorded in the hybrid recording medium, file information comparison means for comparing the file management information acquired by the server information acquisition means with the file management information acquired by the hybrid record information acquisition means, file acquisition means for acquiring a file from the information server based on the compared result of said file information comparison means, file writing means for writing the file acquired in said file acquisition means into a write area of the hybrid recording medium, and file information rewriting means for rewriting file management information residing in the write area of the hybrid recording medium with respect to the file written in said file writing means.

According to a sixth aspect of the invention, an information record apparatus comprises server information acquisition means, hybrid record information acquisition means, file information comparison means, file acquisition means, file writing means, and file information rewriting means, so that update data file residing in the information server can be stored in the write area of the hybrid recording medium and be read out when data of the hybrid recording medium is updated.

Also, according to a seventh aspect of the invention, in an information record apparatus as defined in the sixth aspect, the file management information is volume configuration information in a volume of a file system including the file and file configuration information included in said volume.

According to a seventh aspect of the invention, the file management information of the hybrid recording medium accessed in the information record apparatus is volume configuration information in a volume of a file system and file configuration information included in said volume, so that this hybrid recording medium can be applied in a general file system.

DETAILED DESCRIPTION OF THE PREFERRED EMBODIMENTS

Embodiments of a hybrid recording medium and an information record apparatus according to the invention will be described below with reference to the accompanying drawings.

Figure 1:
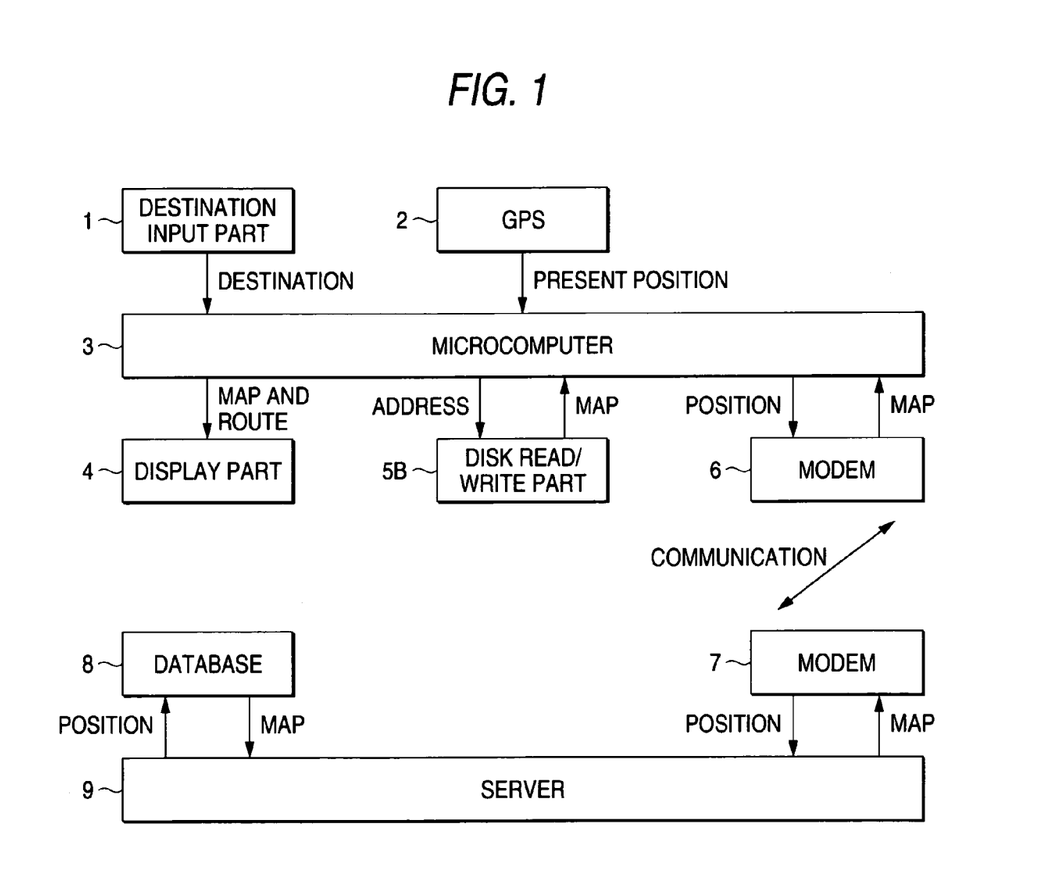
FIG. 1 is a conceptual diagram illustrating the whole configuration of a car navigation system using a hybrid recording medium.

FIG. 1 is an example of a car navigation system using the hybrid recording medium. This system displays a surrounding map including the present position acquired from a disk read/write part 5B, route information to a destination, etc. based on a destination inputted by a destination input part 1 and the present position obtained by a GPS 2 on a display part 4. Also, a surrounding map including the present position acquired by using communications between a modem 7 and a modem 6 from a database 8 connected to a server 9, route information to a destination, etc. are displayed on the display part 4.

Figure 2:
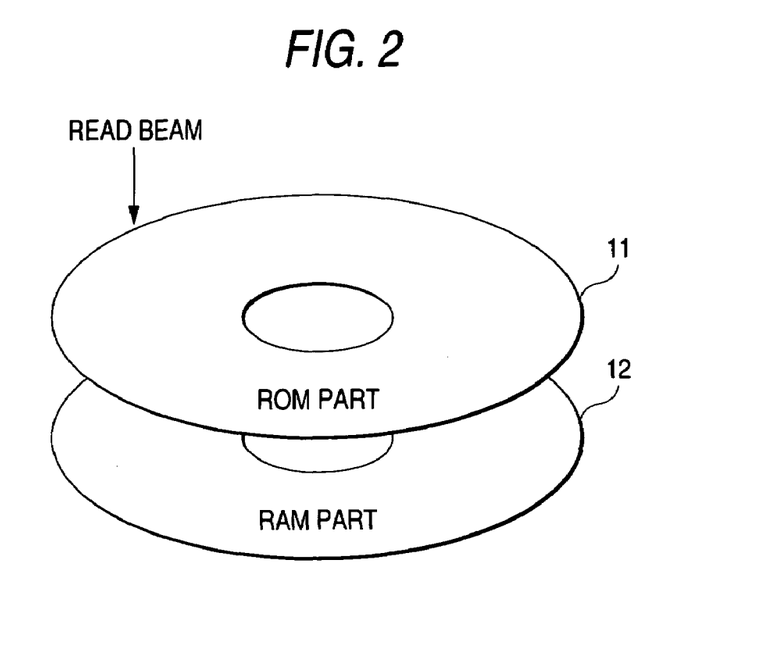
FIG. 2 is a conceptual diagram illustrating a structure of the hybrid recording medium.

Also, an optical disk having a structure in which a ROM part 11 (read-only area) and a RAM part 12 (write area) are formed in two layers as shown in FIG. 2 is inserted into the disk read/write part 5B of the system of FIG. 1.

However, the invention is not limited to this structure, and for example, even when using an optical disk in which a ROM part and a RAM part are divided in inner and outer circumferences even for one layer or solid-state memory having areas of a ROM part and a RAM part, the entirely similar system can be constructed.

Incidentally, in the case of the optical disk having the two-layer structure of the ROM part 11 and the RAM part 12, the optical disk had better be formed in order of a ROM layer (read-only surface) and a RAM layer (write surface) from the irradiation side of a read beam of an optical pickup. This is because in the optical disk, record characteristics become worse when transmittance of the RAM layer is increased and transmittance of the ROM layer in which data is previously recorded can be made higher than that of the RAM layer. That is, by forming the optical disk in the order described above, optical transmittance of the whole optical disk is improved.

Next, a file system of the invention will be described. A file is typically placed on a disk. A primary portion (first accessed) of the disk connected to a calculation system etc. is referred to as a primary file device and the file system is constructed as the center of this device.

Figure 3:
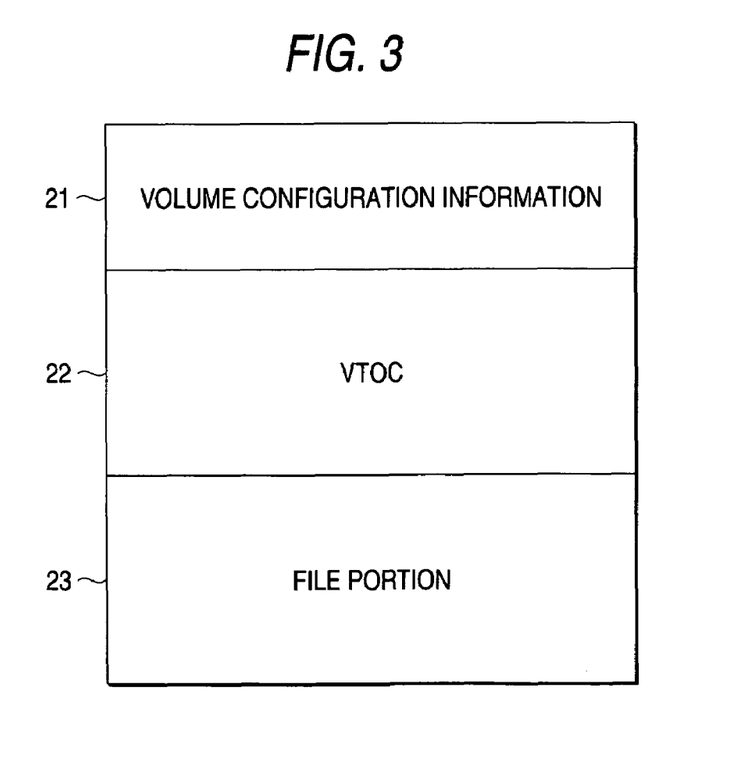
FIG. 3 is a conceptual diagram illustrating a volume structure of a file system.

A portion for actually storing data of a file device in the file system is referred to as a volume. One volume includes one floppy disk, one CD-ROM disk or a magnetic disk within a hard disk device. As shown in FIG. 3, the one volume consists of three portions of volume configuration information 21, file configuration information (VTOC 22) included in the volume, and an actual file portion (file portion 23) included in the volume. The file configuration information included in the volume is also referred to as a volume table of contents (hereinafter called VTOC) or a volume file directory. Here, file management information for managing the file portion 23 is the volume configuration information 21 and the VTOC 22.

The volume configuration information 21 includes information about what blocks the volume is made of in its entirety, how size the VTOC 22 is, where an unused block resides, and so on.

The VTOC 22 includes a name, a size, a position on the volume, access control information, etc. of a file included in the volume.

The file system first reads out the volume configuration information 21 residing in a volume of the primary file device when the system is activated. Next, based on this volume configuration information 21, the VTOC 22 is read out and an area referred to as a system's file directory of main storage is read in. Based on information about the system's file directory, at the request of a user, a file may be read out, a file may be created, or an executable file may be loaded into the main storage to be executed using a loader.

Figure 4:
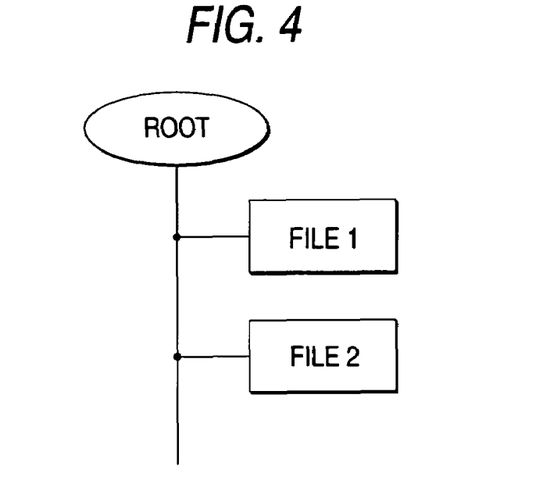
FIG. 4 is a conceptual diagram illustrating a directory structure of the file system.

In CD-ROM or DVD-ROM, for example, information is divided into logical sectors formed of 2048 bytes and the respective logical sectors have logical sector numbers incremented one by one across the whole circumference of a disk. Also, a file system to access these sectors is had and this is indicated, for example, as shown in FIG. 4. Respective files are considered as a set of logical sectors.

Figure 5:
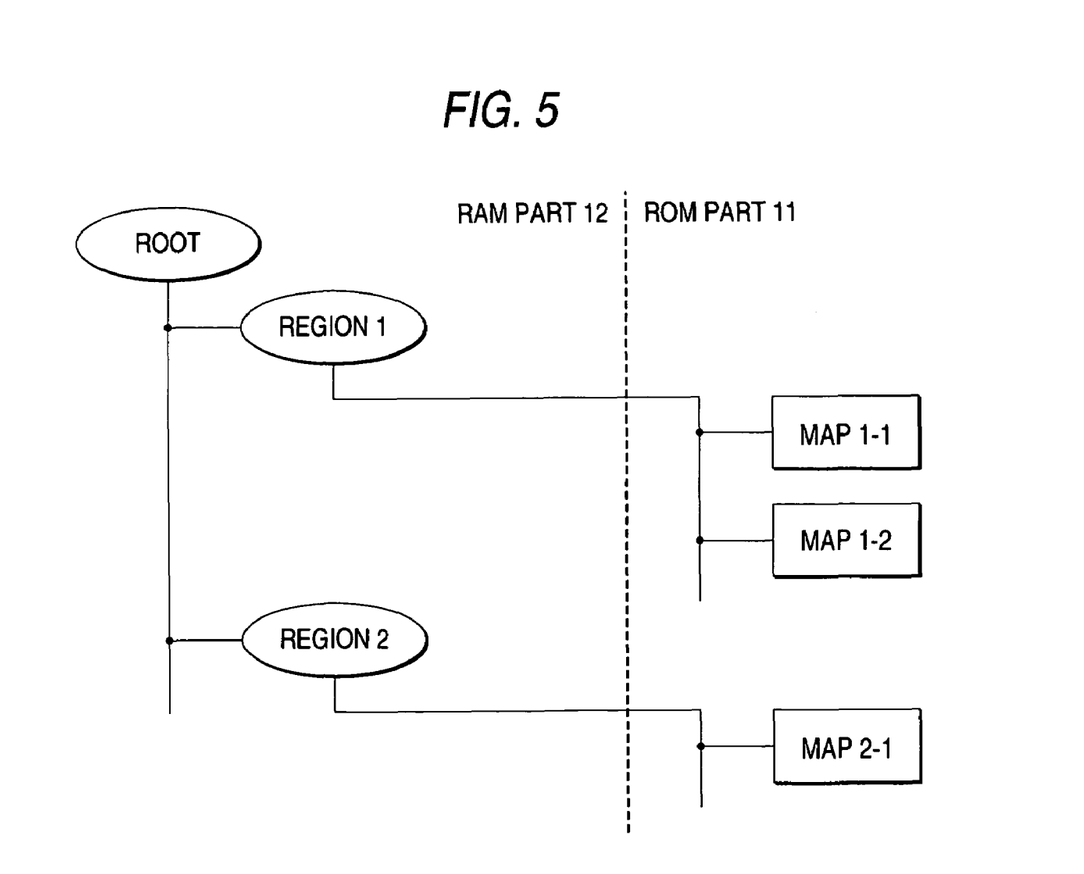
FIG. 5 is a conceptual diagram illustrating a directory structure of a file system in the hybrid recording medium.

A disk used in the embodiment puts serial numbers on sectors of a ROM part and a RAM part and has a directory structure as shown in FIG. 5. Here, the volume configuration information 21, the VTOC 22, and directory information about a root directory and a subdirectory are placed in the RAM part 12, and only data files are placed in the ROM part 11.

Figure 6:
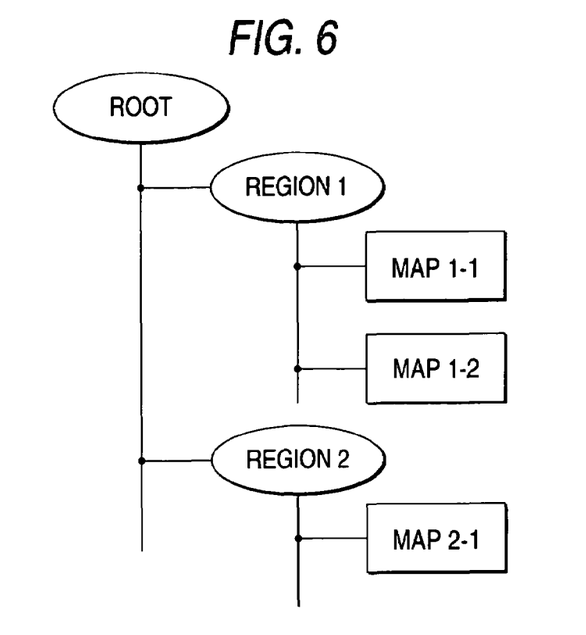
FIG. 6 is a conceptual diagram illustrating a directory structure of a file system in a server.

In the case of map data, the map data is divided into subdirectories (hereinafter called "region subdirectory") using region segments (for example, North Kanto, Shikoku)

as a unit, and data files are placed in the respective region subdirectories. A directory structure of the server 9 is shown in FIG. 6.

Also, each of the map data is preferably as small as possible. A guideline for the size is a size capable of acquisition from a server on the order of several seconds to several ten seconds. Since the amount of data of one data file becomes small by classifying the map data into regions, one communication becomes short when the map data is acquired through communication.

However, even when classifying the map data into regions, it is not efficient to rewrite all the information by one communication. This is because there may be the already rewritten map data among their map data. As a result of this, a VTOC 22 of the server 9 is compared with a VTOC 22 of the disk and the map data with a different date is rewritten.

Figure 8:
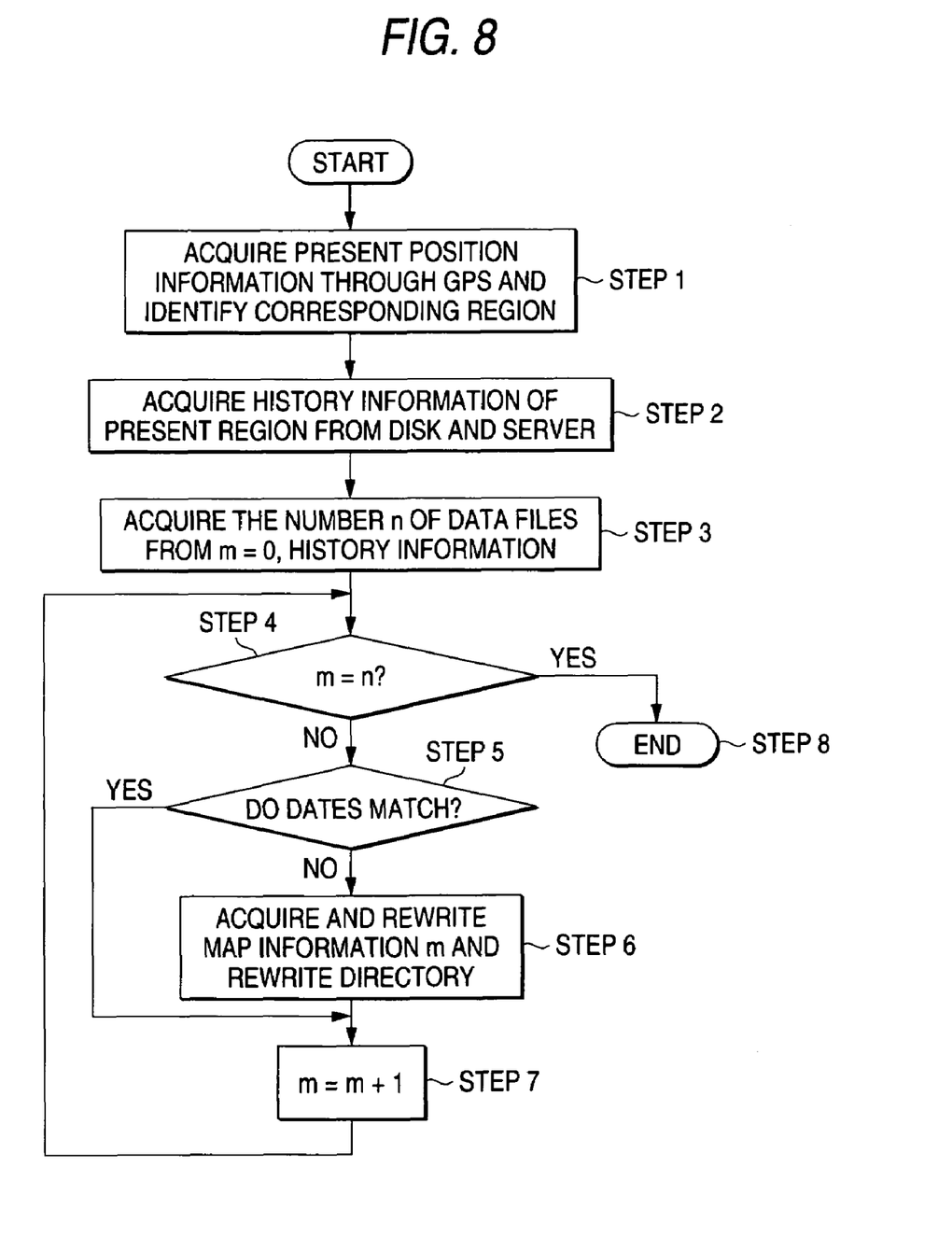
FIG. 8 is a conceptual diagram illustrating an example of a data updating algorithm in the car navigation system of FIG. 1.

Next, an example of a rewrite algorithm of a map in a car navigation system using the hybrid recording medium of FIG. 1 will be described with reference to FIG. 8. Incidentally, here, a method of acquiring the newest map in the present position of my car from a network is used as an example.

First, present position information (latitude and longitude) is acquired through a GPS 2. Based on the acquired present position information, a corresponding region is identified (Step 1).

This method of identifying the corresponding region can be performed, for example, by using a table in which the present position information stored in a storage medium (not shown) provided by a microcomputer 3 is associated with the corresponding region (region code).

Next, history information (the number of data files, update date every data file) about a corresponding region subdirectory identified in Step 1 is acquired from a server 9 and the hybrid recording medium (disk) mounted in a disk read/write part 5B (Step 2).

Here, in order to acquire the history information from the server 9, volume configuration information 21 recorded in the server 9 is first acquired using a network. Next, based on the acquired volume configuration information 21, a VTOC 22 of the server 9 is acquired. Then, history information about a data file residing in the corresponding region subdirectory identified in Step 1 of the server 9 residing in the acquired VTOC 22 is acquired.

Similarly, in order to acquire the history information from the disk mounted in the disk read/write part 5B, volume configuration information 21 recorded in the disk is first acquired. Next, based on the acquired volume configuration information 21, a VTOC 22 of the disk is acquired. Then, history information about a data file residing in the corresponding region subdirectory identified in Step 1 of the disk residing in the acquired VTOC 22 is acquired.

Next, a value is set to counters m, n. In the counter m, it is assumed that m=0. The number of data files of the corresponding region subdirectory in the server 9 acquired in Step 2 is set to the number n of data files (Step 3).

Then, the counter m is compared with the number n of data files (Step 4).

Here, if the counter m is equal to the number n of data files, an operation proceeds to Step 8 and this algorithm is completed. Also, if the counter m is smaller than the number n of data files, an operation proceeds to Step 5.

Subsequently, based on the history information (update date every data file) about the corresponding region subdirectory residing in the server 9 and the history information (update date every data file) about the corresponding region subdirectory residing in the disk, a date of the (m+1)th data file (hereinafter called map information m) of the corresponding region subdirectory residing in the server 9 is compared with a date of map information m about the corresponding region subdirectory residing in the disk (Step 5).

Here, if the dates of the two data files do not match, the map information m about the corresponding region subdirectory residing in the server 9 is first acquired. Next, the map information m acquired from the server 9 is written in the corresponding region subdirectory of a RAM part 12 of the disk. Then, based on a file name, a date, a size, and a position on a volume of the written map information m, information about a root directory and corresponding region subdirectories of the VTOC 22 of the disk is rewritten (Step 6).

Also, if the dates of the two data files match in Step 5, the counter m is counted up by one and an operation proceeds to Step 4 (Step 7).

That is, the operations from Step 4 to Step 7 are repeated until the counter m becomes equal to the number n of data files in Step 4. Incidentally, the algorithm is used in the case of one corresponding region, but in the case of plural corresponding regions, the algorithm may be repeated by the number of corresponding regions.

Even when a map is rewritten, of course, data of a ROM part 11 of the disk is not erased. By writing corresponding data in the RAM part 12 of the disk and rewriting information about a root directory and corresponding region subdirectories of the VTOC 22 of the disk, it appears that map data of the ROM part 11 of the disk is rewritten to the newest data for a user.

Figure 7:
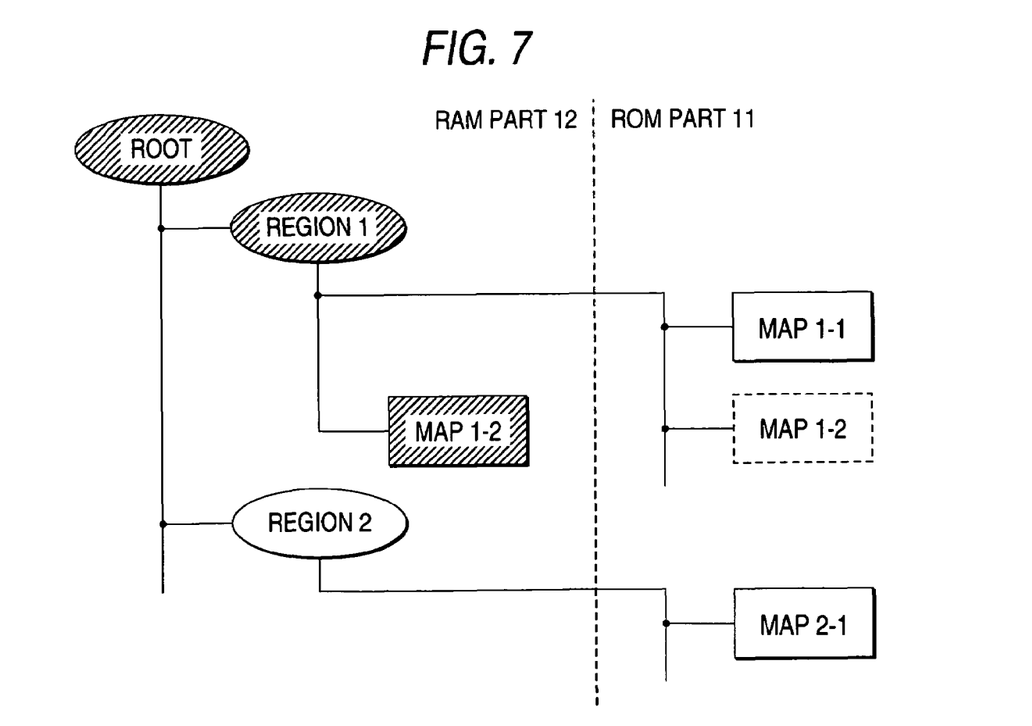
FIG. 7 is a conceptual diagram illustrating updating of directory information of a file system in the hybrid recording medium.

FIG. 7 shows a situation in which a map 1-2 on the disk is rewritten. Information that is newly written and is rewritten is indicated by dithering. The old map 1-2 is left in the ROM part 11, but is not accessed since the information about the directory of the VTOC 22 of the disk is rewritten.

These rewriting do not need to be performed always and may be performed, for example, when the system is activated or when moving to another region different from the original region with a movement of a car. When a route is set, all the regions passing from the present place to a destination may be rewritten.

By the way, a hybrid recording medium is portable when the hybrid recording medium is an optical disk, so that a user can use this hybrid recording medium not only in my car but also in other car or a house. Also, even if failing in writing into the RAM part 12 of the optical disk during a movement of the car, information about the ROM part 11 of the optical disk, namely information at the time of shipment of the optical disk is ensured.

Also, a hard disk instead of the hybrid recording medium may be used. In this case, similar information is previously written in the hard disk and the hard disk is incorporated into a car to be shipped. That is, portability is lost. Also, for a structure of the hard disk, there is no ROM part and all the portions are a RAM part. That is, there is no idea for dividing information into the ROM part and the RAM part, and a directory structure of the hard disk is equal to that of the server as shown in FIG. 6, but a rewrite algorithm of a map in a car navigation system is equal to that of the hybrid recording medium.

Incidentally, the invention is not limited to the embodiment described above. The embodiment is illustrative, and an embodiment having the substantially same configuration as a technical idea described in claims of the invention and having similar action and effect is included in the technical scope of the invention even in case of any embodiment. For example, in the embodiment, map data is stored in a car navigation system, but documents, game information, medical information, etc. can be stored in various systems.

As described above, according to the first aspect of the invention, the read-only area and the write area of the hybrid recording medium are handled as one volume, so that this hybrid recording medium can be applied in a system of handling ROM media of one volume like a conventional type car navigation system and a user can hold the newest data in the hybrid recording medium.

According to the second aspect of the invention, in addition to the effect of the invention as defined in the first aspect, file management information of a hybrid recording medium as defined in the first aspect is volume configuration information in a volume of a file system and file configuration information included in said volume, so that this hybrid recording medium can be applied in a general file system and a user can hold the newest data in the hybrid recording medium.

According to the third aspect of the invention, in addition to the effect of the invention as defined in the first or second aspect, only a file is recorded in the read-only area of a hybrid recording medium as defined in the first or second aspect, so that the file previously recorded in the read-only area of said hybrid recording medium is not lost even if information about the write area of said hybrid recording medium is rewritten, with the result that information at the time of shipment of the hybrid recording medium is ensured.

According to the fourth aspect of the invention, in addition to the effect of the invention as in any one of the first to third aspects, the hybrid recording medium as in any one of the first to third aspects is an optical disk having at least two record surfaces of a read-only surface which is the read-only area and a write surface which is the write area, so that this optical disk can be applied in a system of handling a ROM disk of one volume like a conventional type car navigation system and a user can hold the newest data in the hybrid recording medium.

According to the fifth aspect of the invention, in addition to the effect of the invention as in any one of the first to fourth aspects, the optical disk is formed in order of the read-only surface and the write surface from the irradiation side of a read beam of an optical pickup, so that in the optical disk, optical transmittance of the read-only surface can be made higher than that of the write surface, with the result that a user can use a hybrid optical disk with good optical transmittance.

According to the sixth aspect of the invention, in addition to the effect of the invention as in any one of the first to fifth aspects, an information record apparatus comprises server information acquisition means, hybrid record information acquisition means, file information comparison means, file acquisition means, file writing means, and file information rewriting means, so that when data of the hybrid recording medium is updated, update data file residing in the information server can be stored in the write area of the hybrid recording medium and be read out and a user can hold the newest data in the hybrid recording medium.

According to the seventh aspect of the invention, in addition to the effect of the invention as in any one of the first to sixth aspects, the file management information of the hybrid recording medium accessed in the information record apparatus is volume configuration information in a volume of a file system and file configuration information included in said volume, so that this hybrid recording medium can be applied in a general file system and a user can hold the newest data in the hybrid recording medium.

What is claimed is:

1. A hybrid recording medium comprising:
a read area in which a file is pre-recorded; and
a write area recording and storing an updated version of the pre-recorded file,
wherein the write area further records and stores file management information,
wherein the file management information comprises:
volume configuration information in a volume of a file system comprising the file, and
file configuration information in said volume,
wherein the file configuration information includes a name, a size, a position on the volume, and access control information of the file, and
wherein the write area comprises a module configured to manage the pre-recorded file and the updated version of the pre-recorded file.

2. A hybrid recording medium comprising:
a read area in which a file is pre-recorded; and
a write area recording and storing an updated version of the pre-recorded file,
wherein the write area further records and stores file management information,
wherein the file management information comprises:
volume configuration information in a volume of a file system comprising the file, and
file configuration information in said volume,
wherein the file configuration information includes a name, a size, a position on the volume, and access control information of the file, and
wherein the write area comprises means for managing the pre-recorded file and the updated version of the pre-recorded file.

* * * * *